H. WATSON.
DRAFT EQUALIZER.
APPLICATION FILED MAY 27, 1907.
903,346.
Patented Nov. 10, 1908.
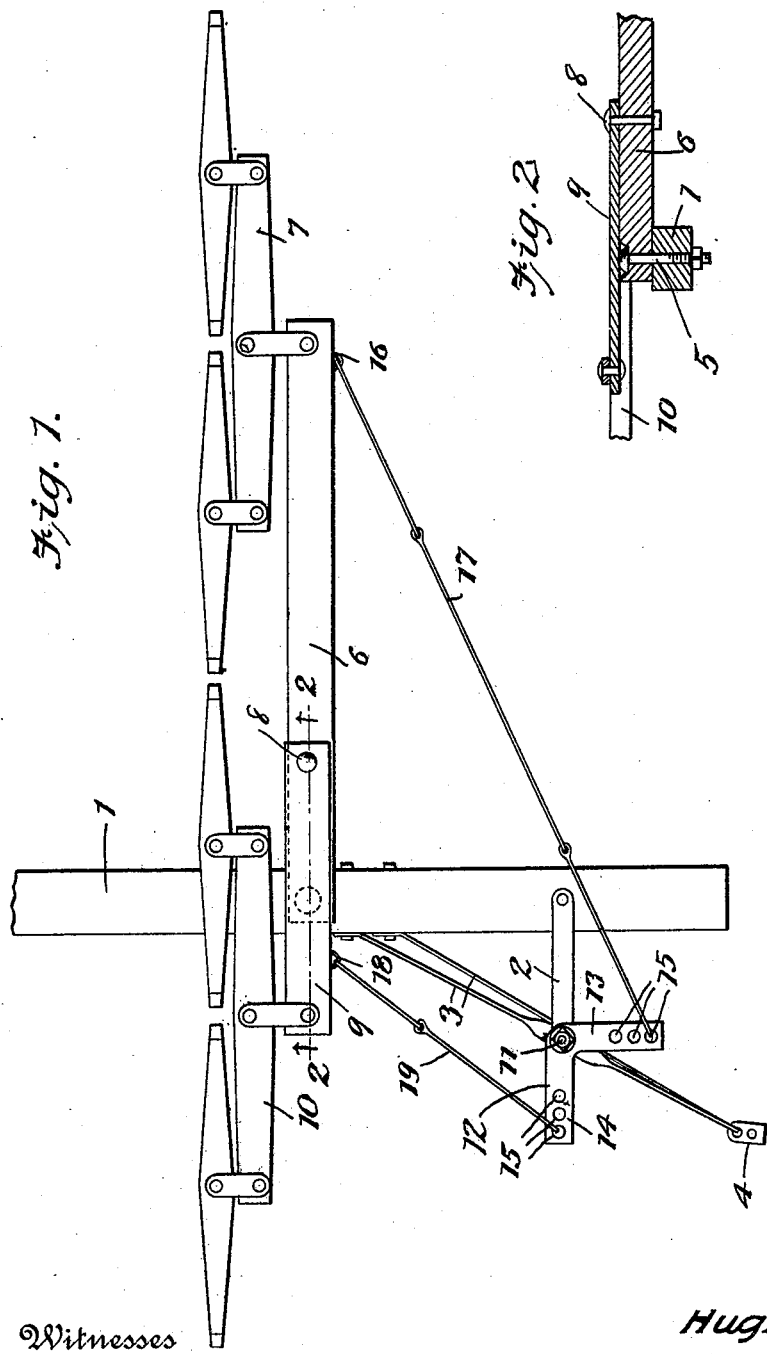
Witnesses
George Hilton
C. H. Griesbauer
Inventor
Hugh Watson,
by H. B. Willson & Co.
Attorneys

UNITED STATES PATENT OFFICE.

HUGH WATSON, OF CAIRO, NEBRASKA.

DRAFT-EQUALIZER.

No. 903,346.  Specification of Letters Patent.  Patented Nov. 10, 1908.

Application filed May 27, 1907. Serial No. 375,929.

*To all whom it may concern:*

Be it known that I, HUGH WATSON, a citizen of the United States, residing at Cairo, in the county of Hall and State of Nebraska, have invented certain new and useful Improvements in Draft-Equalizers; and I do declare the following to be a full, clear, and exact description of the invention, such as will enable others skilled in the art to which it appertains to make and use the same.

This invention relates to draft equalizers, being designed especially for use with a four-horse binder, and has for its objects to provide a simple and inexpensive device of this character which may be readily applied for use, one whereby the draft will be properly equalized between the one horse on the grain side and the three horses on the stubble side of the pole, and one by which side draft will be effectually overcome.

With these and other objects in view, the invention comprises novel features of construction and combination of parts more fully hereinafter described.

In the accompanying drawings,—Figure 1 is a top plan view of a draft equalizer embodying the invention; Fig. 2 is a detail section taken on the line 2—2 of Fig. 1.

Referring to the drawings, 1 designates the vehicle tongue or pole to which is attached, at a point near the rear end of the pole, a transversely projecting bracket arm 2, rigidly sustained in place by means of a pair of brace rods 3, which are in turn engaged at their rear ends with a clip 4 suitably perforated for attachment to a part of the vehicle running gear. Pivoted at its inner end, as at 5, to the pole and at a point suitably in advance of the bracket arm 2, is a main draft bar or lever 6, carrying at its outer end a doubletree 7, while pivoted to the lever 6 at a point between the ends of the latter, as at 8, is an auxiliary draft lever 9, which extends at its outer end to the grain side of the pole and is equipped at said end with a doubletree 10, it being apparent that in action the main lever 6 will tend to swing on its fulcrum 5 under the force of the draft, while the auxiliary lever 9 will in like manner tend to swing on its fulcrum 8. Pivoted at its elbow, by a bolt 11, to the outer end of the bracket arm 2 is an equalizing lever 12 in the form of a bell crank disposed with one of its arms 13 extending rearwardly parallel with the tongue, and the other of its arms 14 extending grainward in a direction transversely of the tongue, the arms 13 and 14 being provided each with a plurality of openings or perforations 15. The bolt 11 also serves to secure the two braces 3 to the bracket arm. Terminally engaged at 16 to the outer end of the main lever 6 is a jointed connecting rod 17 having its other terminal engaged with one of the openings 15 of the lever arm 13, while engaged at one end with the auxiliary lever 9, as at 18, is a jointed connecting rod 19 having its rear end engaged with one of the openings 15 in the lever arm 14, it being apparent that by the provision of a number of the openings in each of the lever arms an adjustable connection of the connecting rods therewith is presented, whereby the parts may be changed, as circumstances require for changing the draft relatively at opposite sides of the pole.

In practice as the draft animals advance the draft between the main and auxiliary levers 6 and 9 will be equalized through the medium of the equalizing lever 12 due to its connection by means of the rods 17 and 19 with the respective draft levers, while at the same time side draft on the pole will be effectually overcome.

It is to be particularly noted that owing to the provision of the bell crank with the arms of which the draft levers are respectively connected, the draft on one lever will be transmitted to the bell crank, and will, through the medium of the latter, be opposed directly to the draft on the other lever; and further that the bracket arm serves to sustain the equalizer lever at a point remote from and on the grain side of the tongue, which feature is essential to the proper equalization of the draft.

Having described my invention, I claim:—

In a device of the class described, a pole, a main draft lever pivoted thereto, an auxiliary lever pivotally connected to the main draft lever, an arm projecting transversely from the pole in the rear of said levers, a pair of diagonally extending braces connected at different points to the pole and at a single point to a part of a vehicle, a bell-crank lever provided with a plurality of adjusting holes in each arm, a bolt for pivotally securing the bell-crank lever to the projecting arm, said bolt securing the diagonal braces to the arm, and a jointed rod connection between each arm of the bell-crank lever and the main and auxiliary levers, respectively.

In testimony whereof I have hereunto set my hand in presence of two subscribing witnesses.

HUGH WATSON.

Witnesses:
S. R. BENTON,
G. W. WABEL.